(12) United States Patent
Amblard et al.

(10) Patent No.: US 10,940,408 B2
(45) Date of Patent: Mar. 9, 2021

(54) DEVICE FOR LIMITING VORTICES AND SOLID DEPOSITS

(71) Applicant: IFP Energies Nouvelles, Rueil-Malmaison (FR)

(72) Inventors: Benjamin Amblard, Lyons (FR); Joao Marques, Chasse sur Rhone (FR); Jean-Francois Le Coz, Saint Germain en Laye (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 16/413,803

(22) Filed: May 16, 2019

(65) Prior Publication Data

US 2019/0351350 A1 Nov. 21, 2019

(30) Foreign Application Priority Data

May 17, 2018 (FR) ...................................... 1854124

(51) Int. Cl.
| | |
|---|---|
| *B01D 21/24* | (2006.01) |
| *B01D 21/00* | (2006.01) |
| *B01D 45/08* | (2006.01) |
| *C10G 31/00* | (2006.01) |
| *C10G 75/00* | (2006.01) |
| *B01J 19/00* | (2006.01) |

(52) U.S. Cl.
CPC ....... *B01D 21/0042* (2013.01); *B01D 21/245* (2013.01); *B01D 45/08* (2013.01); *B01J 19/006* (2013.01); *C10G 31/00* (2013.01); *C10G 75/00* (2013.01); *B01J 2219/00768* (2013.01); *C10G 2300/208* (2013.01)

(58) Field of Classification Search
CPC .. B01D 21/0042; B01D 21/245; B01D 45/08; B01J 19/006; B01J 2219/00768; C10G 31/00; C10G 2300/208
USPC ........... 210/803, 532.1, 534; 95/260; 96/182
See application file for complete search history.

(56) References Cited

U.S. PATENT DOCUMENTS

| | | | |
|---|---|---|---|
| 4,276,262 A | 6/1981 | Cowley | |
| 4,534,851 A | 8/1985 | Allan et al. | |
| 5,478,478 A * | 12/1995 | Griswold | ........... B01D 17/0208 210/534 |
| 7,785,400 B1 * | 8/2010 | Worley | ................. B01D 45/08 95/260 |
| 2004/0149667 A1 * | 8/2004 | Meyer | ................. B01D 21/267 210/532.1 |
| 2006/0047163 A1 | 3/2006 | De Vreede et al. | |

OTHER PUBLICATIONS

Search Report dated Feb. 18, 2019 issued in corresponding FR 1854124 application (2 pages).

* cited by examiner

*Primary Examiner* — Christopher Upton
(74) *Attorney, Agent, or Firm* — Millen, White, Zelano and Branigan, P.C.

(57) ABSTRACT

Downflow hydrocarbon liquid device having a cylindrical upper part, a frustoconical lower part, an outlet pipe and a vortex-limiting system or vortex-breaker, with at least one flat blade and a hydrocarbon feedstocks conversion method employing the device.

23 Claims, 4 Drawing Sheets

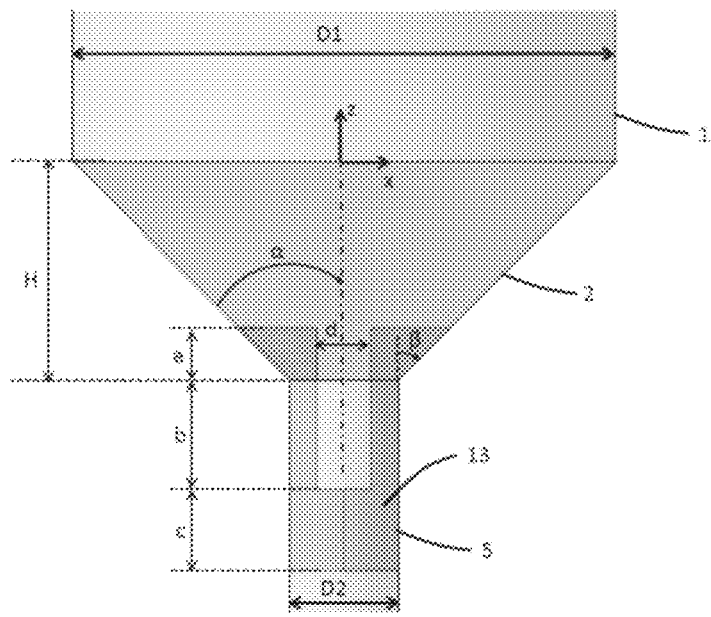
FIG. 4A
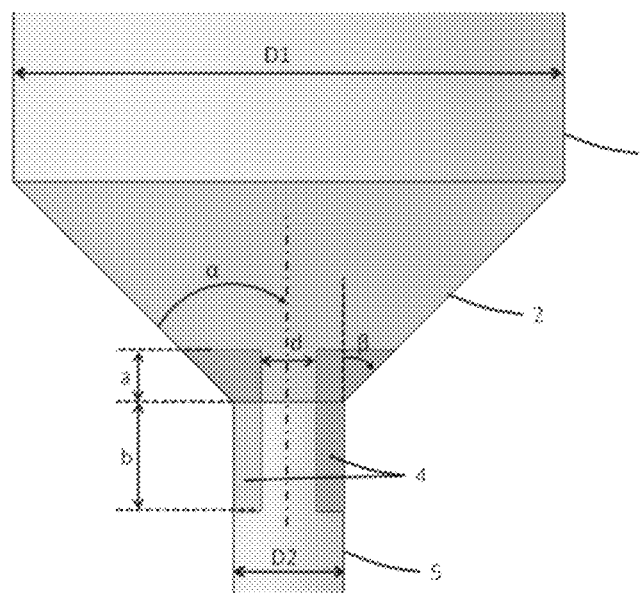
FIG. 4B
FIG. 4

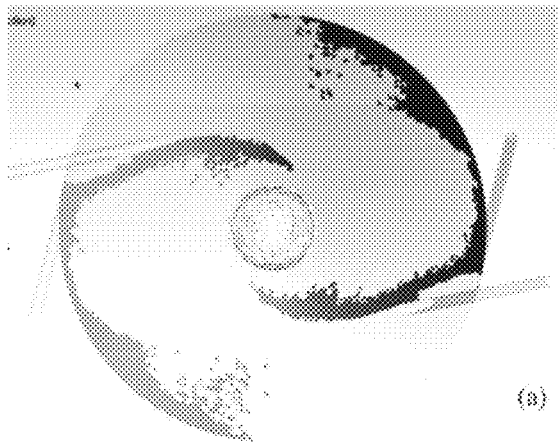
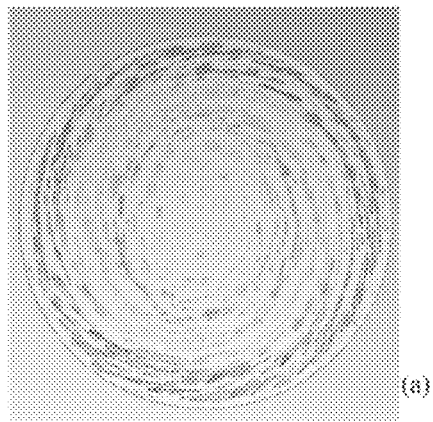
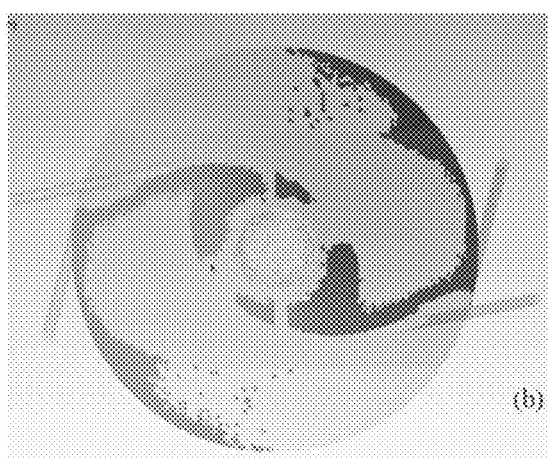
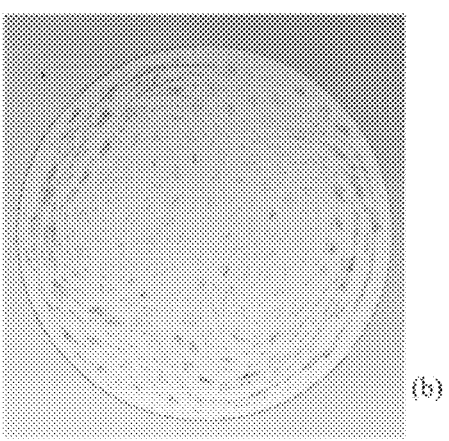
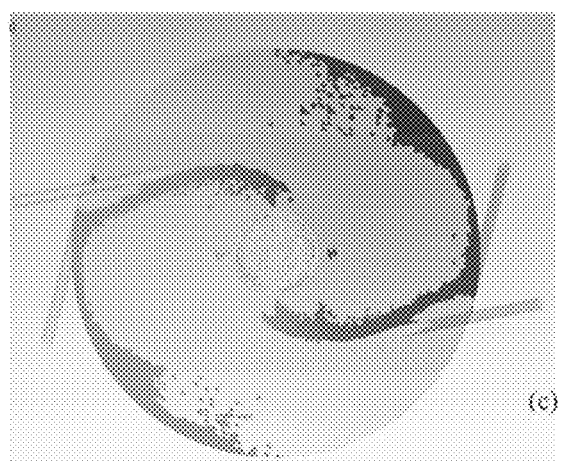
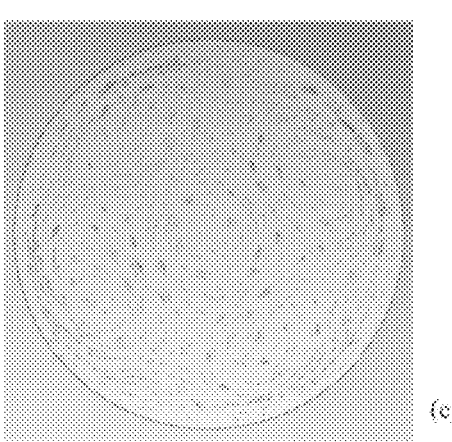
FIG. 5    FIG. 6

DEVICE FOR LIMITING VORTICES AND SOLID DEPOSITS

TECHNICAL FIELD OF THE INVENTION

The invention relates to the field of reducing the deposits of unstable or insoluble molecules or sediments in separation and distillation equipment, preferably equipment with conical bottoms, which are used downstream of refinery methods processing heavy or fouling products. The invention applies non-exhaustively to methods that produce liquids liable to foul the equipment, such as visbreaking, ebullated-bed hydrocracking, catalytic cracking, delayed coking in the refinery of petroleum products and to methods for liquefying coke and treating biomass.

PRIOR ART

The reduction of equipment-fouling deposits is a major problem in units for treating or converting hydrocarbon feedstocks, particularly in the case of heavy feedstocks. This is because the fouling of the equipment entails shutting down the unit and dismantling it in order to carry out cleaning. In units that convert hydrocarbon feedstocks in an ebullated bed, in particular, the fouling of the walls and of the bottom of the separation equipment may be caused by particles of an asphalt-like nature which flocculate to form solid deposits, molecules which adsorb onto the wall, particles of coke, catalyst fines, metal sulfides based on nickel, iron and/or vanadium, or more generally any solid contained in the hydrocarbon feedstock being processed.

U.S. Pat. No. 4,534,851A describes a method for introducing a liquid hydrocarbon feedstock into a transfer pipe leading to a reaction zone, involving an injection of steam and of the hydrocarbon feedstock as upflow, with separate concentric streams, and the stream of hydrocarbon feedstock being the internal stream and the stream of steam being the circumferential stream, and directing some of the steam towards the internal wall of the said transfer pipe, whereas the rest of the steam and of the hydrocarbon feedstock are removed from the zone in a direction parallel to the longitudinal axis.

Patent application US2010012666A describes a special vortex-breaking geometry or anti-swirl deflector comprising a solid surface fixed to a base by spaced-apart solid supports, the said base being fixed to an internal surface of the said wall adjacent to the said outlet, the said anti-swirl deflector being designed to direct the fluid initially away from the said outlet and then through the said outlet, thus minimizing or preventing the formation of vortices at the said outlet.

Patent EP 1 086 734 B1 describes a gas/liquid separation system involved in a method for the ebullated-bed conversion of hydrocarbons, using an apparatus that limits the formation of liquid vortices, made up of vanes adhering to the walls arranged at constant angular spacings to make it possible to dissipate the angular momentum, there being from 2 to 8 of these vanes, the height of these vanes being comprised between the maximum height of the head of liquid and the bottom part of the primary separator.

The prior art does not describe any device comprising a vortex-breaking geometry and making it possible to limit the phenomena whereby solids are deposited in equipment with conical bottoms in the presence of a liquid solid mixture. Conventional vortex-breaking devices specifically do not make it possible to reduce the mean velocity of the liquid while at the same time minimizing the zones where the solids can stagnate.

Unexpectedly, the Applicant Company has discovered that installing a special geometry of vortex-breaker in conical-bottom equipment makes it possible to limit the phenomena whereby solids are deposited, while at the same time reducing the mean velocity of the liquid in equipment with conical bottoms in the presence of a liquid-solid mixture.

SUMMARY OF THE INVENTION

The invention relates to a device for the downflow of a hydrocarbon liquid (3) containing solid particles in the bottom of an item of equipment comprising a cylindrical upper part (1) of diameter D1, a frustoconical lower part (2) of height H and of angle of inclination $\alpha$ comprised between 5° and 85° with respect to the vertical axis (z) of said cylindrical upper part, and an outlet pipe (5) of diameter D2, which comprises a vortex-breaker or vortex-limiting system (4), comprising at least one flat blade (13) arranged coaxial with the said outlet pipe, with symmetry of vertical axis z, comprising:
  a trapezoidal upper part of height (a) and of angle of inclination $\beta$ with respect to the vertical axis (z) which is situated in the frustoconical part (2) of the column, $\beta$ being strictly greater than 0 and less than or equal to $\alpha$;
  and a rectangular lower part of height (b+c) and of width substantially equal to D2, the said blade being hollowed out centrally and symmetrically with respect to the vertical axis over part of its width and over a part of its height at least equal to a.

For preference, the said blade is hollowed out both in the trapezoidal upper part over a height a and in the rectangular lower part over a height b.

The height (a) of the trapezoidal upper part of the blade may be comprised between 0 and 10*D2, preferably between 0.5*D2 and 5*D2, and highly preferably between 0.5*D2 and 2*D2.

The height (b) corresponding to the hollowed-out part of the rectangular lower part of the blade may be comprised between 0 and 4*D2, preferably between 0 and 2*D2, and highly preferably between 0.1*D2 and 2*D2.

The height (c) corresponding to the rectangular lower part of the blade which is not hollowed out is less than 4*D2, preferably less than 2*D2, and highly preferably less than or equal to D2.

Advantageously, the said vortex-breaker comprises at least two blades, each blade being separated from the next by an angle $\delta$, there preferably being 2 to 8 blades, and highly preferably 2 blades.

For preference, each of the blades is hollowed out by a rectangular central opening of width (d) and of length greater than (a), symmetric with respect to the axis z, the opening being inserted at the centre of the said blade.

Advantageously, the ratio between the diameter D1 of the cylindrical part and the diameter D2 of the outlet pipe in the bottom of the frustoconical part (D1/D2) is comprised between 1.1 and 1000, preferably between 2 and 500, and for preference, between 3 and 100.

Advantageously, the angle $\alpha$ is comprised between 10° and 70°, preferably between 15° and 60° and highly preferably between 30° and 50°.

For preference, the angle $\beta$ is equal to $\alpha$.

Advantageously, the diameter D1 is comprised between 0.1 m and 30 m, preferably between 0.5 m and 20 m, and highly preferably between 1 m and 10 m.

In one embodiment, the device further comprises:
at least one injection (8) of recirculated and/or makeup liquid into the frustoconical part (2) of the equipment;
at least one injection (9) of recirculated and/or makeup liquid into the cylindrical part (1) of the equipment;
the said injection(s) (8) situated in the said frustoconical part being inclined with respect to the wall of the frustoconical lower part by an angle β1 in the vertical plane (xz) and by an angle β2 in the horizontal plane (xy); the said injection(s) (9) situated in the said cylindrical part being inclined with respect to the wall of the cylindrical upper part by an angle θ1 in the vertical plane (xz) and by an angle θ2 in the horizontal plane (xy), the angles β1 and θ1 being comprised between 5° and 175°, the angles β2 and θ2 being comprised between 90° and 270°.

The device may comprise a recirculation pipe (7) for part of the liquid leaving the said outlet pipe (5), the said recirculation pipe (7) supplying at least one of the said injections (8) or (9) with recirculated liquid.

The device may comprise a makeup pipe (12) for supplying at least one of the said injections (8) or (9) with makeup liquid.

For preference, the said injections are distributed in horizontal layers in the frustoconical part and in horizontal layers in the cylindrical part, respectively.

For preference, the angles angles β1 and θ1 are comprised between 10° and 150°, highly preferably between 15° and 120°, more preferably between 15° and 90° and even more preferably between 20° and 60°, and the angles β2 and θ2 are comprised between 90° and 180°, preferably equal to 90°.

The height between two horizontal layers is advantageously comprised between 0.01 m and 10 m, preferably between 0.05 m and 5 m, and highly preferably between 0.1 m and 1 m. The number N of injections per layer may be comprised between 1 and 30, preferably between 2 and 20, highly preferably between 2 and 10, more preferably still between 2 and 6, the said injections into the one same layer being spaced by an angle equal to 360/N where N denotes the number of injections per layer.

The said equipment may be a gas/liquid separation means capable of processing hydrocarbon feedstocks.

The invention also relates to a hydrocarbon feedstocks conversion method employing the said device.

The velocity V of the liquid injected in the said injections of the embodiment described hereinabove is advantageously comprised between 0.05 m·s$^{-1}$ and 40 m·s$^{-1}$, preferably between 0.1 m·s$^{-1}$ and 30 m·s$^{-1}$ and highly preferably between 0.5 m·s$^{-1}$ and 10 m·s$^{-1}$.

The level of recirculated and/or of makeup liquid injected with respect to the hydrocarbon liquid circulating through the equipment may be comprised between 1% and 400%, preferably between 5% and 100%, highly preferably between 10% and 60%, and more preferably still between 20 and 50%.

The said method may employ an ebullated-bed hydroconversion step for feedstocks containing hydrocarbon fractions of which at least 50 wt % have a boiling point above 300° C.

DETAILED DESCRIPTION OF THE INVENTION

Brief Description Of The Figures

Other features and advantages of the device according to the invention will become apparent upon reading the following description of nonlimiting exemplary embodiments with reference to the appended figures described hereinbelow.

FIG. 4 (4A and 4B) is a detailed view in cross section of a blade of the vortex-limiting system used in the device according to the invention. FIG. 4A depicts one embodiment in which the blade is hollowed out over part of its length; FIG. 4B depicts an embodiment in which the blade is hollowed out over its entire length (c=0).

FIG. 5 illustrates the example by depicting the stagnation zones for three configurations of conical-bottom equipment: a) device without a vortex-breaker (comparative); b) device with conventional vortex-breaker (comparative); c) device with vortex-breaker according to the invention (in accordance with the invention).

FIG. 6 illustrates the example by depicting liquid-velocity vectors in the plane (xy) in the pipe (5) for the three scenarios a) (comparative), b) (comparative), and c) (in accordance with the invention).

DETAILED DESCRIPTION OF THE INVENTION

In general, the invention applies to any equipment through which a hydrocarbon liquid circulates with the possibility of solid particles stagnating and accumulating in the bottom of the equipment. The flow through the device is downflow. More particularly, the device according to the invention is situated in the lower part of an atmospheric or vacuum distillation column, separation vessel or any other gas/liquid separation means capable of handling hydrocarbon feedstocks.

The device according to the invention makes it possible to limit the deposits of solids while at the same time reducing the tangential velocity of the liquid, in conical-bottom equipment through which a liquid-solid mixture flows as a downflow, by implementing a vortex-limiting system or vortex breaker of particular geometry.

The device according to the invention is used in conical-bottom equipment, which means to say equipment comprising a cylindrical upper part and a frustoconical lower part in which a fouling hydrocarbon liquid (which means to say a liquid containing solid particles or compounds liable to flocculate or to adsorb to the wall) flows as a downflow from the top of the equipment and exits through an outlet pipe. The frustoconical shape is well known to those skilled in the art for minimizing deposits in the bottom by facilitating the drainage of the solids under gravity towards the outlet pipe.

The feedstock entering the device may contain any type of compound derived from an effluent from a hydroconversion method, for example coming from an ebullated-bed H-OIL™ unit, but may also contain any type of compound derived from a slurry hydroconversion method, from a fixed-bed, moving-bed, or fluidized-bed hydrotreatment method, effluent from Fluid Catalytic Cracking (FCC), effluents from thermal conversion methods such as coking, visbreaking, and any other separation methods such as, for example, solvent deasphalting.

The solid particles may be precipitated asphaltenes, supported or unsupported catalyst fines (usually with a diameter of less than 500 microns) or particles of coke, or sulfides of metals such as nickel, vanadium, iron, or molybdenum.

Figure 1:
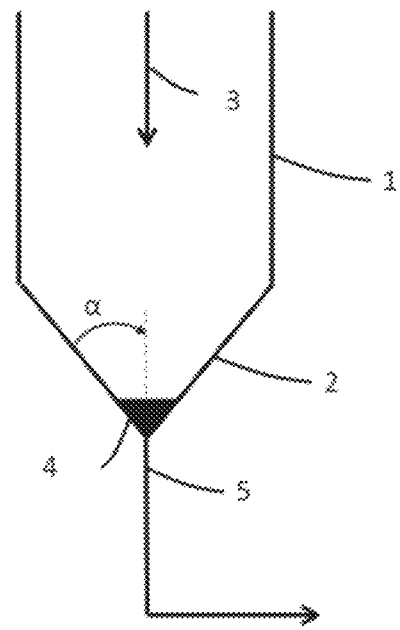
FIG. 1 is the schematic diagram of the device comprising the vortex breaker or vortex-limiting system according to the invention.

FIG. 1:

FIG. 1 is the schematic diagram of the invention.

The invention relates to a device for the downflow of a hydrocarbon liquid containing solid particles (3) in the bottom of an item of equipment, which may for example be a distillation column or a separator or a surge tank. The equipment has a cylindrical upper part (1) of diameter D1, a frustoconical lower part (2), and an outlet pipe (5) situated in the bottom of the equipment, and via which the hydrocarbon liquid leaves, of diameter D2. The frustoconical part (2) (also referred to as the conical bottom) has an angle of inclination α, with respect to the vertical wall of the cylindrical part, embodied by the axis z. The invention employs a special geometry of the vortex breaker (4), employed in part in the bottom of the frustoconical part (2) and in part in the outlet pipe (5).

Figure 2:
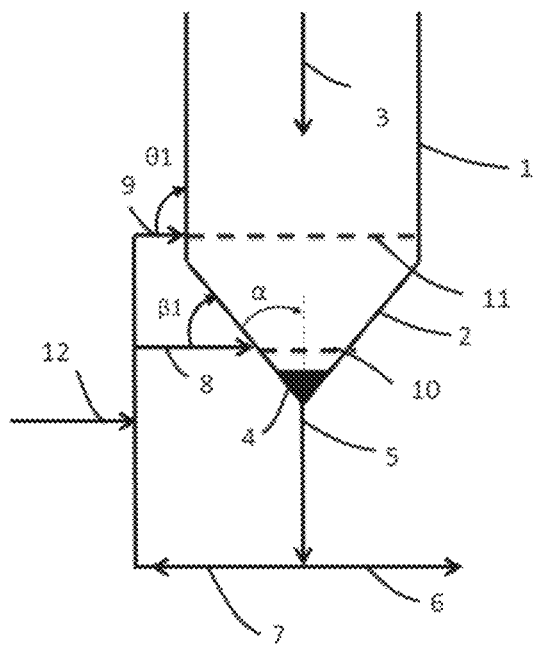
FIG. 2 illustrates the use of the device in the embodiment comprising injections of recirculated and/or makeup hydrocarbon liquid into the cylindrical part and frustoconical part of the conical-bottomed equipment.

FIG. 2:

FIG. 2 is a schematic diagram of one embodiment, comprising lateral injections of liquid.

In one embodiment, the device may also employ lateral injections of recirculated and/or of makeup liquid.

Throughout the text, what is meant by "injection" is any means known to those skilled in the art that allows liquid to be injected from the wall of the equipment towards the inside, the said means being fed via at least one liquid conveying pipe.

In order to reduce still further the formation of deposits on the wall and in the bottom of the equipment, the device may thus comprise lateral injections of recirculated and/or of makeup liquid: injections into the frustoconical part (8) and injections into the cylindrical part (9). These injections may be distributed at the wall in horizontal layers (10) in the frustoconical part and in horizontal layers (11) in the cylindrical part. The stream of exiting liquid is removed from the equipment via a discharge pipe (6).

In a first alternative form, a pipe for makeup liquid (which may be a flux) (12) feeds the lateral injections (8) and (9) situated in the frustoconical part and in the cylindrical part, in order to reduce the stagnation zones in the equipment and limit the deposits of solid particles on the walls. Any fraction having a boiling point higher than or equal to the boiling point of the hydrocarbon liquid (3) with which the equipment is fed, for example effluent from catalytic cracking (Heavy Cycle Oil), LCO (Light Cycle Oil), or any other VGO (Vacuum Gas Oil), AR (Atmospheric Residue), VR (Vacuum Residue), DAO (DeAsphalted Oil), or aromatic extract fraction, may be suitable as makeup liquid. According to this embodiment, the flowrate of liquid exiting via the discharge pipe (6) is equal to the sum of the flowrate of hydrocarbon liquid circulating through the equipment (3) and of the flowrate of makeup liquid injected in the makeup pipe (12). The makeup liquid injected through the makeup pipe (12) makes it possible to reduce the stagnation zones by generating turbulence in the equipment so as to limit the depositing of solid particles on the walls. The said injected makeup liquid may also act as a flux or be able to act as a solvent with respect to the species at the limit of solubility in the liquid phase when the liquid chosen is an aromatic base.

According to another alternative form, a proportion of the hydrocarbon liquid exiting the equipment may be recirculated to feed the lateral injections (8) and (9). According to this embodiment, the flowrate of liquid exiting via the discharge pipe (6) is equal to the flowrate of the liquid circulating through the equipment (3). The liquid recirculated through the recirculation pipe (7) makes it possible to reduce the stagnation zones in the equipment by generating turbulence so as to limit the depositing of solid particles on the walls.

According to a final alternative form, the liquid injected in the lateral injections (8) and (9) may come both from the recirculation pipe (7) and from the liquid makeup pipe (12).

According to this embodiment, the flowrate of liquid exiting via the discharge pipe (6) is equal to the sum of the flowrate of hydrocarbon liquid circulating through the equipment, referred to as fouling liquid (3), and of the flowrate of makeup liquid injected in the makeup pipe (12). The liquid injected through the makeup pipe (12) and through the recirculation pipe (7) makes it possible to reduce the stagnation zones by generating turbulence in the equipment so as to limit the depositing of solid particles on the walls, and may also act as a flux as mentioned hereinabove.

The liquid injected by the lateral injections (8) and (9) may therefore be liquid recirculated from the equipment and/or makeup liquid, namely a liquid coming from outside of the equipment.

The level of injection of the liquid injected by the lateral injections (8) and (9) is defined as being the ratio between the sum of the flowrate of liquid in the recirculation pipe (7) and of the flowrate of liquid in the makeup pipe (12) to the flowrate of hydrocarbon liquid circulating through the equipment, or fouling liquid (3).

There are two types of liquid injection (makeup or recirculated) defined:

The injections (8) into the frustoconical part (2) of the equipment.

The injections (9) into the cylindrical part (1) of the equipment.

The injections (8) situated in the frustoconical part (2) are inclined with respect to the wall of the conical bottom by an angle β1 in the vertical plane (xz) and by an angle β2 in the horizontal plane (xy), x denoting the horizontal axis and z denoting the vertical axis of the cylindrical part perpendicular to the horizontal plane (xy).

The injections (9) situated in the cylindrical part (1) are inclined with respect to the wall of the cylindrical body by an angle θ1 in the vertical plane (xz) and by an angle θ2 in the horizontal plane (xy).

The injections are advantageously oriented in the same direction of rotation in the horizontal plane (xy) and advantageously situated in the liquid part of the bottom of the column.

The injections may be installed at the wall of the equipment in horizontal layers (11) in the plane (xy) in the case of the injections (9) into the cylindrical part (1), and in horizontal layers (10) in the case of the injections (8) into the frustoconical part (2). Each layer of injections (10) into the frustoconical (2) and (11) into the cylindrical part (1) respectively comprises a number N of injections (8) or (9) located at the same height along the axis (z). in FIG. 3, N is equal to 1. Each of the layers are separated by a height $H_h$. Within a layer, each injection is separated from the next by an angle equal to 360/N in the plane (xy). One layer of injections may be angularly offset from another layer of injections in the plane (xy).

The number of layers in each of the frustoconical or cylindrical part is advantageously comprised between 1 and 20, preferably between 1 and 10, and for preference between 1 and 6.

The velocity V of the liquid injected into the lateral injection pipes (8) and (9) is advantageously comprised between 0.05 m·s$^{-1}$ and 40 m·s$^{-1}$, preferably between 0.1 m·s$^{-1}$ and 30 m·s$^{-1}$ and highly preferably between 0.5 m·s$^{-1}$ and 10 m·s$^{-1}$. For preference, the diameters of the injection pipes are dimensioned according to the flowrate of liquid to be injected so as to obtain the desired injection velocities.

The flowrate of liquid recirculated by the recirculation pipe (7) plus the flowrate of liquid injected by the pipe (12), to the flowrate of hydrocarbon liquid (3) circulating through the equipment is advantageously comprised between 1% and 400%, preferably between 5% and 100%, highly preferably between 10% and 60%, and more preferably still between 20 and 50%.

The angles β1 and θ1 are comprised between 5° and 175° with respect, respectively, to the wall of the frustoconical part and to the wall of the cylindrical part, and preferably between 10° and 150°, highly preferably between 15° and 120° and more preferably between 15° and 90°, and more preferably still between 20° and 60°.

The angles β2 and θ2 are comprised between 90° and 270° with respect to the diameter along the axis y of the cylindrical section, and preferably between 90° and 180°. Highly preferably, the angles β2 and θ2 are equal to 90°.

The number N of injections at the wall of the equipment, in each horizontal layer (11) in the cylindrical part (1) and in each horizontal layer (10) in the frustoconical part (2) is comprised between 1 and 30, preferably between 2 and 20, highly preferably between 2 and 10, and most preferably between 2 and 6. Each layer, whether this be within the one same part or in the two parts, may have a different number N of injections.

The height between two horizontal layers is advantageously comprised between 0.01 m and 10 m, preferably between 0.05 m and 5 m, and highly preferably between 0.1 m and 1 m.

The angle separating the injections in the circumference of the one same layer is comprised between 0° and 180°, preferably between 5° and 120°, highly preferably between 10° and 90°. Advantageously, this angle is equal to 360/N where N denotes the number of injections per layer.

The angular offset of one layer with respect to another may be comprised between 0° and 180°, preferably between 5° and 120°, and highly preferably between 10° and 90°.

Figure 3:
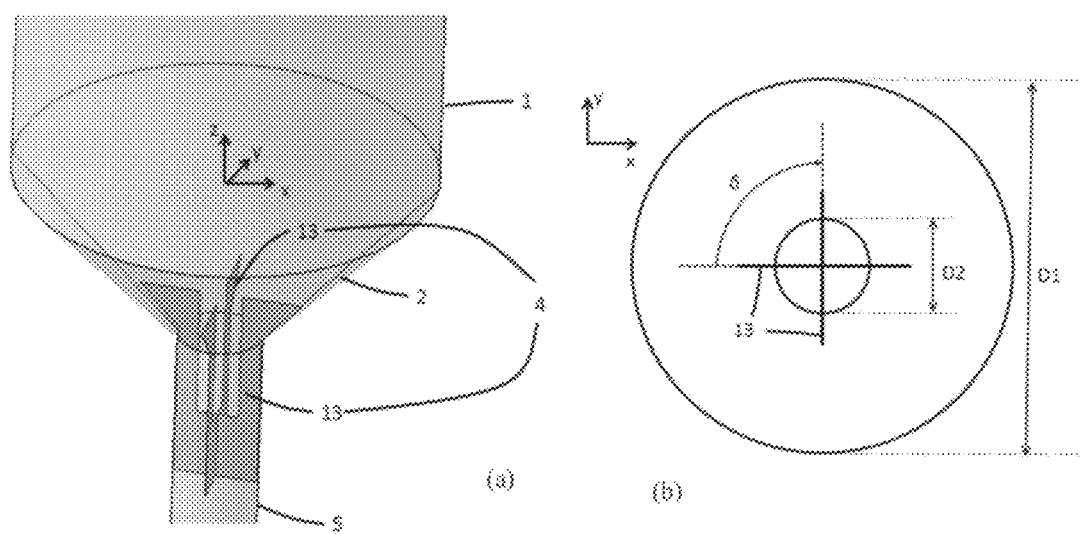
FIG. 3 (3A: isometric view, 3B: plan view) shows the vortex-limiting system for liquid flows containing solid particles which is used in the device according to the invention.

FIG. 3:

FIG. 3 shows a detailed geometry of the vortex breaker (4).

FIG. 3A shows an isometric view and FIG. 3B shows a plan view, from above, of the vortex breaker or vortex-limiting system according to the invention (4). In the example of FIG. 3, the vortex breaker (4) is made up of two blades (13), which thus form a system comprising four vanes fixed to the wall. The layout of the blades is symmetrical with respect to the axis of the column and each of the blades is separated by an angle δ.

FIG. 3A depicts the device for the downflow of a hydrocarbon liquid containing solid particles, notably suspended matter, at the bottom of an item of equipment comprising a cylindrical upper part (1) of diameter D1, a frustoconical lower part (2) of angle of inclination α comprised between 5° and 85° with respect to the vertical axis (z) of the said cylindrical upper part, and an outlet pipe (5) of diameter D2, which comprises a vortex-limiting system, referred to as vortex breaker (4), comprising at least one flat blade (13) arranged coaxial with the outlet pipe, with symmetry of vertical axis z, the said blade comprising a trapezoidal upper part which is positioned in the frustoconical part (2) of the column and a rectangular lower part, and the said blade being hollowed out symmetrically with respect to the vertical axis z, at its centre, over part of its width and over a part of its height at least equal to the height of the trapezoidal part. The said blade is advantageously fixed, for example by welding or bonding, to the wall over at least part of its external edges.

For preference, as indicated in FIG. 3A, the said blade is hollowed out both in the trapezoidal upper part over a height a and in the rectangular lower part over at least a height b.

Highly preferably, the said blade is hollowed out over its entire length, and thus forms two vanes fixed at least in part to the wall of the equipment.

For preference, the opening in the trapezoidal part of the blade is the same shape as, and aligned with, the opening in the rectangular part of the blade.

In one embodiment, as indicated in FIG. 3A, each of the blades is hollowed out by a rectangular central opening of width (d) and of length greater than a, symmetric with respect to the axis z, the opening being inserted at the centre of the said blade.

For preference, the system comprises at least two blades, preferably 2 to 8, and highly preferably 2, as indicated in FIGS. 3A and 3B, arranged at constant angular spacings to make it possible to dissipate the angular momentum. Each blade is thus separated from the next by an angle δ (FIG. 3B). Highly preferably, when the number of blades is equal to 2, the blades are arranged orthogonal to one another (δ=90° C.).

The detailed geometry of the blades (13) is shown in FIG. 4.

FIG. 4:

The blades (13) are installed in the bottom of a column with a cylindrical part (1) of diameter D1 and a frustoconical part (2) of angle α opening onto an outlet pipe (5) of diameter D2. The height H of the frustoconical part (2) is dependent on the values chosen for D1, D2 and α.

The geometry of the blades (13) is symmetrical with respect to the axis z. In FIG. 4A, the blade comprises three distinct parts:

A trapezoidal first part of height (a) which is situated in the frustoconical part (2) of the column. The height (a) is comprised between the bottom of the frustoconical part (2) and the upper part of the blade (13). In this part, the blade (13) widens inside the frustoconical part (2) with an angle β. In FIG. 4, a rectangular opening of width (d), symmetrical with respect to the axis z, is inserted in the centre of the blade (13).

A second part of height (b) within the outlet pipe (5). The height (b) is comprised between the bottom of the conical part (2) and the start of the third part of height (c). In this part of height (b), the opening of width (d) is present and aligned with the opening of the first part of height (a).

A third part of height (c) which is positioned within the pipe (5). The height (c) is comprised between the end of the second part of height (b) and the lower part of the blade (13). In this third part, the blade is solid, which is to say that there is no opening in the centre of the blade.

The diameter D1 of the cylindrical part (1) of the equipment that allows the liquid containing solid particles to flow is advantageously comprised between 0.1 m and 30 m, preferably between 0.5 m and 20 m, and highly preferably between 1 m and 10 m.

The ratio between the diameter D1 of the cylindrical part (1) and the diameter D2 of the outlet pipe (5) in the bottom of the frustoconical part (D1/D2) is advantageously comprised between 1.1 and 1000, preferably between 2 and 500, and for preference, between 3 and 100.

The angle α is the angle of inclination of the frustoconical part with respect to the vertical wall (of axis z) of the cylindrical part and is comprised between 5° and 85°, preferably between 10° and 70°, highly preferably between 15°, and 60°, and more preferably still between 30° and 50°.

The number of blades (13) is advantageously comprised between 1 and 8, preferably between 2 and 8, and highly preferably equal to 2.

The height (a) is advantageously comprised between 0 and 10*D2, and preferably between 0.5*D2 and 5*D2, highly preferably between 0.5*D2 and 2*D2.

The height (b) corresponding to the rectangular lower part of the blade which is hollowed out is advantageously comprised between 0 and 4*D2, preferably between 0 and 2*D2, and highly preferably between 0.1*D2 and D2.

The height (c) corresponding to the rectangular lower part of the blade which is solid (and therefore not hollowed out) is advantageously comprised between 0 and 4*D2, preferably between 0 and 2*D2, and highly preferably between 0 and D2.

For preference, as depicted in FIG. 4B, the blade has no part of height (c) and is therefore centrally hollowed out over its entire height.

The angle β of inclination of the flat blade (13) in its trapezoidal part, which corresponds to the widening of the blade (13) in the frustoconical part (2), is strictly greater than 0 and less than or equal to α, and advantageously equal to α.

Similarly, the device according to the invention may be adapted to suit equipment with hemispherical or elliptical bottoms or bottoms of any other shape exhibiting symmetry of revolution by choosing a profile that suits the local shape of the bottom around the outlet pipe, notably a suitable angle for the upper part of the blade.

The vortex-limiting system is advantageously at least partly fixed to the wall of the pipe of diameter D2 by welding, bonding or any other means.

Advantages of the Invention

The part of height (a) of the vortex-limiting system in the frustoconical part (2) makes it possible to limit the stagnation zones and therefore the depositing of solids in the bottom of the equipment.

The central hollowing of the blade allows the solid present in the centre of the column to flow towards the high-velocity zones of the pipe (5) without the possibility of this solid becoming caught on a wall (as in conventional vortex breakers).

EXAMPLES

CFD (Computational Fluid Dynamics) simulations of the flow of liquid in a gas/liquid separation column were performed using the Fluent software which utilises a Eulerian approach for the liquid phase (http://www.afs.enea.it/project/neptunius/docs/fluent/html/th/node319.htm#sec-multiphase-eulerian). In these simulations, it is assumed that the solid particles have no influence on the liquid flow. This assumption is notably justified for flows referred to as dilute which have low solids concentrations.

The liquid velocities close to the wall of the frustoconical bottom are used as a criterion for defining zones susceptible to deposits, referred to as stagnation zones. All the zones in which the liquid velocity is greater than 10 cm/s are considered to be "non-stagnation zones" and, conversely, all the zones in which the liquid velocities are less than 10 cm/s are considered to be "stagnation zones" (zones where the solid particles can easily accumulate).

Table 1 shows the simulation conditions and the dimensions of the gas/liquid separation column for the embodiment in which the lateral injections of liquid are present. Three simulations were performed:

First simulation: device without vortex breaker

Second simulation: device with vortex breaker according to the prior art, comprising 2 solid blades arranged at right angles only in the frustoconical part of the equipment Third simulation: device with vortex breaker according to the invention

TABLE 1

| Equipment dimensions | |
|---|---|
| Diameter D1 (m) | 1.2 |
| Diameter D2 (m) | 0.25 |
| Angle α | 45° |
| Number of layers 7 | 1 |
| Number of layers 8 | 1 |
| Number of injections per layer | 2 |
| Angle β1 and θ1 | 0° |
| Angle β2 and θ 2 | 90° |
| Operating conditions | |
| Liquid density (kg/m³) | 990 |
| Net liquid flow rate (kg/s) | 9.8 |
| Percentage of liquid recirculated | 30% |
| Geometry of vortex breaker according to the prior art (comparative) | |
| Number of blades | 2 |
| δ | 90° |
| a (mm) | 300 |
| b (mm) | 0 |
| c (mm) | 0 |
| d (mm) | 0 |
| β | 45° |
| Geometry of vortex breaker according to the invention | |
| Number of blades | 2 |
| δ | 90° |
| a (mm) | 55 |
| b (mm) | 100 |
| c (mm) | 0 |
| d (mm) | 120 |
| β | 45° |

FIG. 5 shows the stagnation zones for the three scenarios simulated.

FIG. 6 shows the liquid velocity vectors in the plane (xy) in the outlet pipe (5) for the three scenarios simulated.

In the scenarios with vortex breaker (comparative with conventional vortex breaker, and according to the invention), the liquid velocities in the plane (xy) in the pipe (5) are lower than in the comparative scenario without vortex breaker as set out in Table 2. In addition, there is no liquid rotation effect when a vortex breaker is present.

TABLE 2

| | Without vortex breaker | With comparative vortex breaker | With vortex breaker according to the invention |
|---|---|---|---|
| Mean tangential velocity of liquid in the plane (xy) in the pipe (5) (cm/s). | 8 | 1 | 1 |

Next, when the device with conventional vortex breaker and the device with vortex breaker according to the invention are compared, the stagnation zones are greater in the case of the conventional vortex breaker, as shown in Table 3.

TABLE 3

| | Without vortex breaker | With comparative vortex breaker | With vortex breaker according to the invention |
|---|---|---|---|
| Percentage of stagnation zone over the surface of the frustoconical bottom (2) | 16% | 28% | 16% |

Thus, the geometry proposed in the invention makes it possible to break the effects of vortices while at the same time minimizing the stagnation zones, notably maintaining the benefit of the injections of liquid upstream of the outlet pipe. Only the device according to the invention makes it possible to reduce the tangential velocity of the liquid while at the same time minimizing the stagnation of the solids.

The invention claimed is:

1. A device suitable for the downflow of a hydrocarbon liquid (3) containing solid particles in the bottom of an item of equipment comprising a cylindrical upper part (1) of diameter D1, a frustoconical lower part (2) of height H, said frustoconical lower part (2) having an angle of inclination α comprised between 5° and 85° with respect to the vertical axis (z) of said cylindrical upper part, and an outlet pipe (5) of diameter D2, said device comprising a vortex-breaker or vortex-limiting system (4) comprising at least one flat blade (13) arranged coaxial with the said outlet pipe, with symmetry of vertical axis z, comprising:
   a trapezoidal upper part of height (a), said trapezoidal upper part having an angle of inclination β with respect to the vertical axis (z) which is situated in the frustoconical part (2) of the column, the value of β being strictly greater than 0 and less than or equal to the value of α;
   and a rectangular lower part of height (b+c) and of width substantially equal to D2,
the said blade being hollowed out centrally and symmetrically with respect to the vertical axis over part of its width and over a part of its height at least equal to a.

2. The device according to claim 1, in which the said blade is hollowed out both in the trapezoidal upper part over a height a and in the rectangular lower part over a height b.

3. The device according to claim 1, in which the height (a) of the trapezoidal upper part of the blade is comprised between 0 and 10*D2.

4. The device according to claim 1, in which the height (b) corresponding to the hollowed-out part of the rectangular lower part of the blade is comprised between 0 and 4*D2.

5. The device according to claim 1, in which the height (c) corresponding to the rectangular lower part of the blade which is not hollowed out is less than 4*D2.

6. The device according to claim 1, in which the vortex-breaker comprises at least two blades, each blade being separated from the next by an angle δ.

7. The device according to claim 1, in which each of the blades is hollowed out by a rectangular central opening of width (d) and of length greater than (a), symmetric with respect to the axis z, the opening being inserted at the center of the blade.

8. The device according to claim 1, in which the ratio between the diameter D1 of the cylindrical part and the diameter D2 of the outlet pipe in the bottom of the frustoconical part (D1/D2) is comprised between 1.1 and 1000.

9. The device according to claim 1, in which the angle α is comprised between 10° and 70°.

10. The device according to claim 1, in which the value of angle β is equal to the value of angle α.

11. The device according to claim 1, in which the diameter D1 is 0.1 m to 30 m.

12. The device according to claim 1, further comprising:
   at least one injection (8) of recirculated and/or makeup liquid into the frustoconical part (2) of the equipment;
   at least one injection (9) of recirculated and/or makeup liquid into the cylindrical part (1) of the equipment;
   the said injection(s) (8) situated in the said frustoconical part being inclined with respect to the wall of the frustoconical lower part by an angle β1 in the vertical plane (xz) and by an angle β2 in the horizontal plane (xy); the said injection(s) (9) situated in the said cylindrical part being inclined with respect to the wall of the cylindrical upper part by an angle θ1 in the vertical plane (xz) and by an angle θ2 in the horizontal plane (xy), the angles θ1 and θ1 being 5° to 175°, the angles θ2 and θ2 being 90° to 270°.

13. The device according to claim 12, comprising a recirculation pipe (7) for part of the liquid leaving the said outlet pipe (5), the said recirculation pipe (7) supplying at least one of the said injections (8) or (9) with recirculated liquid.

14. The device according to claim 12, comprising a makeup pipe (12) supplying at least one of the said injections (8) or (9) with makeup liquid.

15. The device according to claim 12, in which the injections are distributed in horizontal layers in the frustoconical part and in horizontal layers in the cylindrical part, respectively.

16. The device according to claim 15, in which the number N of injections per layer is 1 to 30, the injections into the one same layer being spaced by an angle equal to 360/N where N denotes the number of injections per layer.

17. The device according to claim 12, in which the angles β1 and θ1 are 10° to 150°, and the angles θ2 and θ2 are 90° to 180°.

18. The device according to claim 12, in which the height between two horizontal layers is 0.01 m to 10 m.

19. The method converting hydrocarbon feedstocks implementing a device according to claim 12, in which the velocity V of the liquid injected in the said injections is 0.05 m·s$^{-1}$ to 40 m·s$^{-1}$.

20. The method according to claim 19, in which the level of recirculated and/or of makeup liquid injected with respect to the hydrocarbon liquid circulating through the equipment is 1% to 400%.

21. The device according to claim 1, in which the equipment is a gas/liquid separation means capable of processing hydrocarbon feedstocks.

22. A method comprising converting hydrocarbon feedstocks implementing a device according to claim 1.

23. The method according to claim 22, employing an ebullated-bed hydroconversion step for feedstocks containing hydrocarbon fractions of which at least 50 wt % have a boiling point above 300° C.

* * * * *